United States Patent
Wang et al.

(10) Patent No.: US 11,442,178 B2
(45) Date of Patent: Sep. 13, 2022

(54) METHOD FOR ACHIEVING SPACE-BASED AUTONOMOUS NAVIGATION OF GLOBAL NAVIGATION SATELLITE SYSTEM (GNSS) SATELLITES

(71) Applicant: Technology and Engineering Center for Space Utilization, Chinese Academy of Sciences, Beijing (CN)

(72) Inventors: Wenbin Wang, Beijing (CN); Yang Gao, Beijing (CN); Leizheng Shu, Beijing (CN); Jiangkai Liu, Beijing (CN)

(73) Assignee: TECHNOLOGY AND ENGINEERING CENTER FOR SPACE UTILIZATION, CHINESE ACADEMY OF SCIENCES, Beijing (CN)

( * ) Notice: Subject to any disclaimer, the term of this patent is extended or adjusted under 35 U.S.C. 154(b) by 401 days.

(21) Appl. No.: 16/837,158

(22) Filed: Apr. 1, 2020

(65) Prior Publication Data
US 2020/0319350 A1 Oct. 8, 2020

(30) Foreign Application Priority Data
Apr. 2, 2019 (CN) .......................... 201910263156.1

(51) Int. Cl.
| G01S 19/39 | (2010.01) |
| B64G 1/10 | (2006.01) |
| G06F 17/16 | (2006.01) |
| G06F 17/13 | (2006.01) |
| G01S 19/42 | (2010.01) |

(52) U.S. Cl.
CPC .......... *G01S 19/393* (2019.08); *B64G 1/1007* (2013.01); *B64G 1/1014* (2013.01); *G01S 19/421* (2013.01); *G06F 17/13* (2013.01); *G06F 17/16* (2013.01)

(58) Field of Classification Search
CPC ... G01S 19/393; G01S 19/421; B64G 1/1007; B64G 1/1014; G06F 17/13; G06F 17/16
See application file for complete search history.

(56) References Cited

U.S. PATENT DOCUMENTS

| 2010/0060518 A1* | 3/2010 | Bar-Sever | G01S 19/27 342/357.66 |
| 2017/0227654 A1* | 8/2017 | Gogliettino | G01S 19/27 |
| 2018/0172837 A1* | 6/2018 | Niemenlehto | G01S 19/27 |
| 2021/0206517 A1* | 7/2021 | Kalabic | B64G 1/242 |

* cited by examiner

*Primary Examiner* — Hussein El Chanti
(74) *Attorney, Agent, or Firm* — Panitch Schwarze Belisario & Nadel LLP (57) ABSTRACT

Disclosed is a method for achieving space-based autonomous navigation of global navigation satellite system (GNSS) satellites, and relates to the field of satellite navigation technologies. The method includes the following steps: optimizing a DRO, and establishing a dynamic model of an earth-moon space satellite orbit; establishing measurement links, by a low earth orbit (LEO) data relay satellite, with an earth-moon space DRO satellite and a GNSS respectively, and measuring an inter-satellite distance for modeling and linearization; adopting an extended Kalman filter (EKF) method to process inter-satellite measurement data, and autonomously determining a position and velocity of the global navigation satellite system without depending on the ground measurement and control support.

14 Claims, 5 Drawing Sheets

METHOD FOR ACHIEVING SPACE-BASED AUTONOMOUS NAVIGATION OF GLOBAL NAVIGATION SATELLITE SYSTEM (GNSS) SATELLITES

CROSS-REFERENCE TO RELATED APPLICATIONS

This application claims priority under 35 U.S.C. § 119(b) to Chinese Application No. 201910263156.1, filed Apr. 2, 2019, the disclosure of which is incorporated by reference herein in its entirety.

TECHNICAL FIELD

The present invention relates to the field of satellite navigation technologies, and in particular, to a method for achieving space-based autonomous navigation of global navigation satellite system (GNSS) satellites.

BACKGROUD OF THE INVENTION

At present, a GNSS includes a GPS navigation constellation, a Beidou navigation constellation, a Glonass navigation constellation, and the like, and provided positioning and timing services have been widely used in various fields such as agriculture, industry and commerce, national defense, and people's livelihood. The satellite navigation system generally includes three parts: a space segment, a ground segment and a user segment. A main body of the space segment is a certain number of satellites distributed in a space orbit, usually located in a medium earth orbit (MEO), a geostationary orbit (GEO) or an inclined geosynchronous orbit (IGSO). A main function of the navigation satellites is to continuously transmit navigation signals to the near-earth space and the ground, so that at least four signals can be received at any position at any time. The ground segment is responsible for the overall management of the whole system. Its main functions include: tracking the whole constellation satellite, calculating a position state of the navigation satellite through measurement signals of the satellite and a ground station, and calculating a clock difference of a satellite clock to ensure the time synchronization; updating and uploading navigation message data, and the like. The user segment is to compute the position, velocity and time (PVT) of a user after receiving navigation signals by a GNSS receiver. The concept of autonomous navigation of navigation satellites mentioned in this patent mainly refers to the position determination (positioning) realized by navigation constellations independent of the ground station's measurement and control. And the timing of the navigations is not considered in this patent.

GNSS satellites has the requirement of autonomous navigation, moreover, there exist several problems:

1) Delay effects of a troposphere and an ionosphere on navigation signals

Navigation signals are subjected to delay effects in the atmospheric troposphere and ionosphere during the propagation to the ground. Although the delay amount is also calculated as a data product in the ground analysis process, the decrease in the measurement signal accuracy between satellites and the ground affects the positioning and timing accuracy of the navigation satellites to a certain extent.

2) The measurement geometry between satellites and the ground changes slowly.

An MEO satellite among the navigation satellites has an orbital period of 12 hours, and a measurement geometry (namely a relative geometric position relationship) between the MEO satellite and a ground station changes relatively slowly. An IGSO satellite among Beidou satellites has an orbital period of 24 hours, and even the Beidou GEO satellite is stationary with respect to the ground station. The slow change of the conventional satellite-ground measurement geometry is not conducive to the calculation of the position and clock difference of the navigation satellite.

BRIEF SUMMARY OF THE INVENTION

The present invention aims to provide a method for achieving autonomous navigation of GNSS satellites by using a DRO (Distant retrograde Orbit) and inter-satellite measurement.

In order to achieve the foregoing objective, the technical solution adopted by the present invention is as follows:

a method for achieving autonomous navigation of GNSS satellites, including the following steps:

S1: optimizing a cislunar DRO, and establishing a orbital dynamic model the cislunar space;

S2: establishing measurement links, by a low earth orbit (LEO) data relay satellite, with a DRO satellite and the GNSS satellites respectively, and measuring an inter-satellite distance for modeling and linearization; and S3: adopting a data processing method to process inter-satellite measurement data, and autonomously determining the position and velocity of the GNSS satellites without using earth-based measurement.

For a near-earth two-body problem, only the size, shape , and the relative orientation of the orbits can be determined through inter-satellite links, and an absolute orientation of the orbit planes cannot be determined. If orbits of two satellites make the same rotation around the center of the earth, although an absolute orbit state changes, a relative series does not change. Therefore, in general, it is not observable for determining the absolute orbit of the satellite by using inter-satellite relative measurement in a symmetric gravitational field. However, there is a region in an earth-moon three-body orbital space, whose magnitudes influenced by the gravitational effect of the earth and the moon can be comparable, and the two are no longer different in order of magnitude. The distribution of the gravity field in this region is asymmetric. If the orbit of a satellite moves in this region, the asymmetry of the gravity field can provide absolute pointing information of the satellite orbit plane, and then the absolute orbit plane of the satellite can also be determined. This technology is called linked autonomous inter-planetarium satellite navigation (LiAISON), which makes it possible to determine the absolute orbit of a satellite by using inter-satellite relative measurement. Previous studies by scholars have mainly focused on autonomous navigation using aa halo orbit in cislunar space. However, the main problem of the halo orbit is unstable, and orbit maneuver is often required to maintain the orbit, so the halo orbit does not have advantageous for providing long-term navigation information for GNSS satellites. However, there is still a kind of DROs in the cislunar space, which is stable in the long-term even considering all the orbit perturbation errors. The first step of the present invention is to select one preferred DRO.

Preferably, in step S 1, the step of optimizing an earth-moon space DRO specifically includes:

A1: deducing an earth-moon DRO family with periodic characteristics from a circular restricted three-body problem (CRTBP) model.

In fact, some orbits in the DRO family are also located in regions with strong asymmetry of the earth-moon three-body gravity field. Hill gave a concept of gravity asymmetry to evaluate the degree of asymmetry of the gravity field in different spatial positions.

A2: calculating gravity asymmetry of each orbit, and selecting an orbit with high gravity asymmetry as a preferred earth-moon DRO.

Preferably, in step S 1, the step of establishing a dynamic model of an earth-moon space satellite orbit specifically includes:

B 1: establishing satellite state vectors: at any time t, $y_D^j(t)$, $y_M^k(t)$ and $y_T^l(t)$ denote position and velocity state vectors of a j-th DRO satellite, a k-th navigation satellite and an l-th LEO data relay satellite, respectively, namely $y_D^j(t)$ 32 $[r_D^j(t)^T, v_D^j(t)^T]^T$, $y_M^j(t) = [r_M^j(t)^T, v_M^j(t)^T]^T$ and $y_T^j(t) = [r_T^j(t)^T, v_T^j(t)^T]^T$;

where the numbers of satellites participating in orbit determination are J, K and L respectively, j=0, ...,J−1, k=0,...,K−1 and l=0,...,L−1, and the state vector of each type of satellites is denoted as:

$$y_D(t) = [y_D^0(t)^T, \ldots, y_D^{J-1}(t)^T]^T$$

and $$y_M(t) = [y_M^0(t)^T, \ldots, y_M^{K-1}(t)^T]^T$$

and $$y_T(t) = [y_T^0(t)^T, \ldots, y_T^{L-1}(t)^T]^T$$

which are further combined into a state vector:

$$X(t) = [y_D(t)^T, y_M(t)^T, y_T(t)^T]^T$$

B2: extrapolating an orbit state of any satellite according to a first-order dynamic differential equation:

$$\begin{bmatrix} \dot{r} \\ \dot{v} \end{bmatrix} = \begin{bmatrix} v \\ a_E + a_M + a_S + a_{SRP} + a_D \end{bmatrix}$$

where $a_E$ and $a_M$ m are spherical harmonic gravity acceleration models of the earth and the moon respectively, $a_S$ is a gravity acceleration of the solar particle, $a_{SRP}$ is an acceleration of solar radiation light pressure, and $a_D$ is mainly an atmospheric drag acceleration suffered by an LEO satellite; and B3: calculating a state transition matrix $\Phi_i \Box \Phi(t_i, t_{i-1}) = \partial X(t_i)/\partial X(t_{i-1})$ from any time $t_{i-1}$ to the next time $t_i$.

Preferably, in step B2, the first-order dynamic differential equation can be described as:

$$\dot{X}(t) = f(X(t), t)$$

in step B3, the state transition matrix n follows a variational equation:

$$\dot{\Phi}_i = \frac{\partial f(t_i, X(t_i))}{\partial X(t_i)} \Phi_i.$$

Preferably, step S2 specifically includes:

S21: at any time $t_i$, an inter-satellite measurement model of an l-th LEO satellite and a j-th DRO satellite and a k-th navigation satellite being as follows:

$$\begin{cases} z_{DT,i}^{jl} = h_{DT}^{jl}(y_D^j(t_i), y_T^l(t_i)) + \varepsilon_{DL} = |r_D^j(t_i) - r_T^l(t_i)| + \varepsilon_{DL} \\ z_{MT,i}^{kl} = h_{MT}^{kl}(y_M^k(t_i), y_T^l(t_i)) + \varepsilon_{ML} = |r_M^k(t_i) - r_T^l(t_i)| + \varepsilon_{ML} \end{cases}$$

where z is a measured value, h is a model value, and ε is a measurement noise;

S22: $X_i^- = [(y_{D,i}^-)^T, (y_{M,i}^-)^T, (y_{T,i}^-)^T]^T$ being a known initial state of a satellite, and linearizing the measurement model (8) near the state:

$$z_{DT,i}^{jl} = h_{DT}^{jl}(y_{D,i}^{j-}, y_{T,i}^{l-}) + H_{DD,i}^{jl} \cdot \Delta y_{D,i}^j + H_{DT,i}^{jl} \cdot \Delta y_{T,i}^l + \varepsilon_{DT}$$

$$z_{MT,i}^{kl} = h_{MT}^{kl}(y_{M,i}^{k-}, y_{T,i}^{l-}) + H_{MM,i}^{kl} \cdot \Delta y_{M,i}^k + H_{MT,i}^{kl} \cdot \Delta y_{T,i}^l + \varepsilon_{MT}$$

where $H_{DD,i}^{jl} \Box \frac{\partial h_{DT,i}^{jl}}{\partial y_{D,i}^{j-}}$, $H_{DT,i}^{jl} \Box \frac{\partial h_{DT,i}^{jl}}{\partial y_{T,i}^{l-}}$, $H_{MM,i}^{kl} \Box \frac{\partial h_{MT,i}^{kl}}{\partial y_{M,i}^{k-}}$, $H_{MT,i}^{kl} \Box \frac{\partial h_{MT,i}^{kl}}{\partial y_{T,i}^{l-}}$, and there are relations $H_{DT,i}^{jl} = -H_{DD,i}^{jl}$ and $H_{MT,i}^{kl} = -H_{MM,i}^{kl}$;

$\Delta X_i = [(\Delta y_{D,i}^-)^T, (\Delta y_{M,i}^-)^T, (\Delta y_{T,i}^-)^T]^T$ is set to be an increment of a to-be-estimated state with respect to an initial value state, and then $\Delta X_i = X_i - X_i^-$;

S23: combining all measured values into $$z_i = [z_{DT,i}^T, z_{MT,i}^T]^T,$$

with a component denoted as:

$$z_{DT,i} = [z_{DT,i}^{00}, \ldots, z_{DT,i}^{J-1,0}, \ldots, z_{DT,i}^{0,L-1}, \ldots, z_{DT,i}^{J-1,L-1}]^T$$

$$z_{MT,i} = [z_{MT,i}^{00}, \ldots, z_{MT,i}^{K-1,0}, \ldots, z_{MT,i}^{0,L-1}, \ldots, z_{MT,i}^{K-1,L-1}]^T$$

where a corresponding model value is $h_i(X_i) = [h_{DT,i}^T, h_{MT,i}^T]^T$, and a measurement error is $\varepsilon = [(\varepsilon_{DL})^T, (\varepsilon_{ML})^T]$; standard deviations of microwave measurement and laser measurement errors are $\sigma_{DL}$ and $\sigma_{ML}$ in respectively; and S24: at the time $t_i$, a linearization measurement model including all measured values is:

$$\begin{bmatrix} z_{DT,i} \\ z_{MT,i} \end{bmatrix} = \begin{bmatrix} h_{DT,i}(X_i^-) \\ h_{MT,i}(X_i^-) \end{bmatrix} + \begin{bmatrix} H_{DD,i} & 0 & H_{DT,i} \\ 0 & H_{MM,i} & H_{MT,i} \end{bmatrix} \cdot \begin{bmatrix} \Delta y_{D,i} \\ \Delta y_{M,i} \\ \Delta y_{T,i} \end{bmatrix} + \begin{bmatrix} \varepsilon_D \\ \varepsilon_M \end{bmatrix}$$

which is further simplified as:

$$z_i = h_i(X_i^-) + H_i \cdot \Delta X_i + \varepsilon$$

Figure 2:
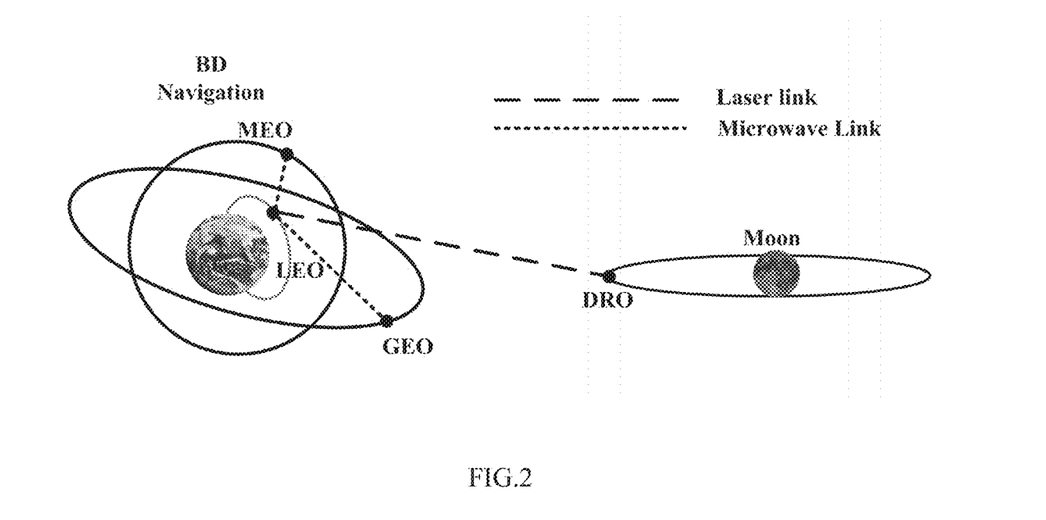
FIG. 2 is a schematic diagram of space-based measurement and control autonomous navigation of a GNSS constellation based on a DRO and an LEO data relay orbit.

Further, there are two types of measurement links used in establishing the measurement model. As shown in FIG. 2, one type is laser measurement links of DRO satellites and LEO satellites, which need to be provided with laser transceivers respectively. The other type is microwave measurement links of navigation constellations and LEO satellites, which are LEO satellites. The data measured between the two types of satellites is estimated in orbit by a Kalman filter method, and orbit states of all satellites in the link are at the same time. ephemeris of the navigation constellation is injected into the navigation satellite to maintain the ability of the navigation satellite to provide high-accuracy navigation services.

Preferably, step S3 specifically includes:

S31: adding a process noise u(t) to a dynamic equation:

$$\dot{X}(t) = f(X(t), u(t), t)$$

where u(t) is a white Gaussian noise with zero mean value; correspondingly, a process noise transform matrix is:

$$\Gamma(t_i, t_{i-1}) = \frac{\partial X(t_i)}{\partial u(t_{i-1})}$$

S32: given an initial state and time of the satellite, processing, by an EKF, measurement data based on continuous measurement epochs, and updating a to-be-estimated state.

Preferably, step S32 specifically includes:

A. time update where a satellite orbit state and a state estimation covariance are advanced from the previous time $t_{i-1}$ (add "+" to a right superscript) to the current observation time $t_i$ (add "−" to a right superscript):

$$X_i^- = X(t_i; X(t_{i-1}) = X_{i-1}^+) + \Gamma(t_i, t_{i-1}) u(t_{i-1})$$

$$P_i^- = \Phi(t_i, t_{i-1}) P_{i-1}^+ \Phi^T(t_i, t_{i-1}) + \Gamma(t_i, t_{i-1}) Q_c \Gamma^T(t_i, t_{i-1})$$

where P is an orbit state covariance matrix, $Q_c$ is a process noise covariance matrix and is a (3J+3K+3L)-dimensional diagonal matrix, a diagonal value is related to dynamic model accuracy of each satellite, and a variance of an acceleration error is set as $\sigma_c^2$; a format of the process noise conversion matrix $\Gamma$ is:

$$\Gamma = \begin{bmatrix} \Gamma_0 & & & 0 \\ & \Gamma_1 & & \\ & & \ddots & \\ 0 & & & \Gamma_{J+K+L-1} \end{bmatrix}$$

where a diagonal submatrix is denoted as:

$$\Gamma_k = \begin{bmatrix} \Delta t^2/2 \times I_{3\times 3} \\ \Delta t \times I_{3\times 3} \end{bmatrix}_{6\times 3}$$

where $\Delta t = t_i - t_{i-1}$, I is an identity matrix, 0 is a zero matrix, and k=0,1, . . . ,J+K+L−1.

B. measurement update where the solution of a satellite orbit state and update of an orbit state covariance are completed by using measurement data:

$$K_i = P_i^- H_i^T (R_i + H_i P_i^- H_i^T)^{-1}$$

$$X_i^+ = X_i^- + K_i(z_i - h(X_i^-))$$

$$P_i^+ = (I - K_i H_i) P_i^- (I - K_i H_i)^T + K_i R_i K_i^T$$

where $K_i$ is a Kalman gain, $H_i$ is a design matrix and is calculated by equation (12), I is an identity matrix, $R_i$ is a measuring noise covariance diagonal matrix, a diagonal element value corresponding to laser measurement data is $\sigma_{DL}^2$, and a diagonal element value corresponding to microwave measurement data is $\sigma_{ML}^2$.

It is worth noting that there is currently no effective solution for autonomous navigation of navigation constellation satellites. Some scholars have proposed using X-ray pulsar signals to realize autonomous navigation of navigation satellites, but the solution has the following shortcomings. First, a timing measurement error of the pulsar signals is relatively poor, which is far from meeting the demand of navigation satellites for high-accuracy positioning. At present, the SEXTANT project in the United States is carrying out pulsar navigation experiments on the International Space Station, with an in-orbit positioning accuracy of only 5 km. Second, the solution requires each navigation satellite to carry a heavy and expensive X-ray detector, which does not conform to the current operation mode of the navigation satellite. The links between navigation satellites currently being studied cannot realize autonomous navigation of satellites either. Due to the symmetry of the gravity field in the near-earth space, the rotation of the constellation cannot be sensed, and navigation satellite positioning still relies mainly on ground measurement and control stations. The main objective of the inter-satellite link is to keep the time synchronization between satellites. Therefore, there is no effective solution at present to meet both high-accuracy and long-term autonomous positioning demands.

There are two key points for realizing this technical solution. One key point is that some orbits in an earth-moon space retrograde orbit family are located in a space region with strong asymmetry of an earth-moon three-body gravity field; and if the orbits establish inter-satellite measurement links with earth satellites, it is expected to determine absolute positions of all satellites at both ends of the link in an inertial space through inter-satellite relative measurement. The other key point is that in view of the objective reality that a DRO cannot directly establish a high-accuracy measurement link with GNSS satellite orbit, a concept of a LEO data relay satellite is proposed innovatively, and indirect high-accuracy measurement of the DRO and the GNSS satellite orbit is achieved.

The present invention has the following beneficial effects:

This patent proposes an innovative method to implement an indirect link between a DRO and navigation constellation through a LEO data relay satellite. Suppose the LEO data relay satellite carries a GNSS receiver and a laser measuring device. A laser link is established between a DRO satellite and the LEO data relay satellite, and a microwave link is established between the navigation constellation and the LEO data relay satellite, which has the following advantages:

(1) The existing operation mode of the navigation constellation is not affected, and the LEO data relay satellite can receive high-accuracy microwave measurement data of the navigation satellite.

(2) The selected DRO is 330,000 to 440,000 km away from the earth, with a large observation field of view. At the same time, the DRO has long-term stability and is expected to greatly reduce orbital maintenance costs.

(3) The period of LEO satellite is short, the geometric range between the LEO satellite the GNSS navigation constellation and the DRO changes significantly, and the observation geometry is better, which is conducive to navigation calculation.

(4) Space laser and microwave links are not affected by the earth's atmosphere and ionosphere delay, and the measurement data processing accuracy is higher.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

To make the objective, technical solutions and advantages of the present invention clearer, the following further describes the present invention in detail with reference to the accompanying drawings. It should be understood that the specific implementations described herein are merely illustrative of the present invention and are not intended to limit the present invention.

Explanation of professional terms:

DRO family: Earth-moon DRO family

GNSS : Global Navigation Satellite System

Gravity asymmetry: It is defined as the ratio of the amplitude of the gravity acceleration of a third body received at any spatial position to the sum of all accelerations received at the position. When near the earth space, the moon is the third body; and in contrast, when near the moon space, the earth is classified as the third body.

Embodiment 1

Figure 1:
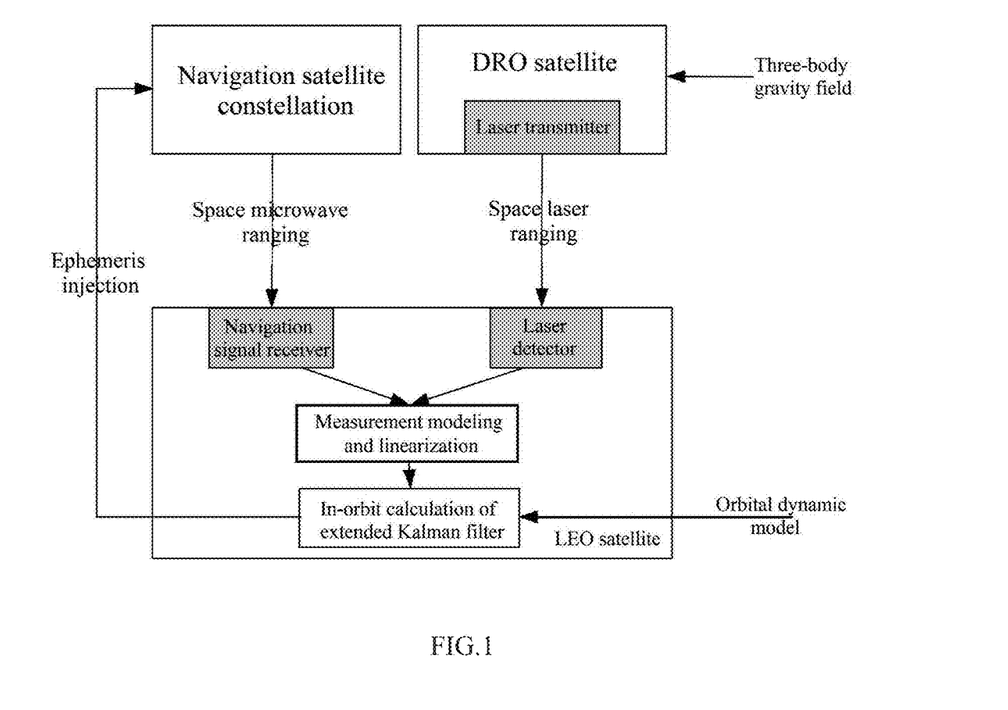
FIG. 1 is a schematic flowchart of implementation of autonomous navigation of a navigation constellation.

This embodiment provides a method for achieving GNSS-based autonomous navigation of a space segment satellite, as shown in FIG. 1, including the following steps.

S1: Optimize an earth-moon space DRO, and establish a dynamic model of an earth-moon space satellite orbit.

S2: Establish measurement links, by an LEO data relay satellite, with an earth-moon space DRO satellite and a GNSS satellite respectively, and measure an inter-satellite distance for modeling and linearization.

S3: Adopt an extended Kalman filter (EKF) method to process inter-satellite measurement data, and autonomously determine a position and velocity of the GNSS without depending on the ground measurement and control support.

Figure 3:
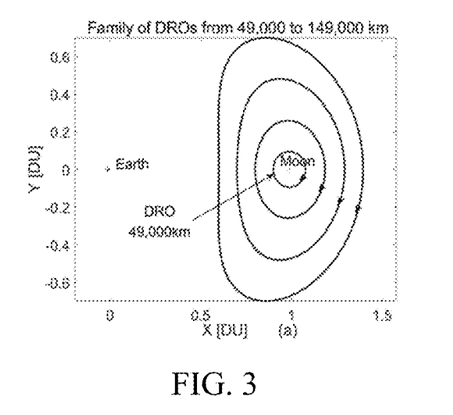
FIG. 3 is a DRO family in a (CRTBP) model.
Figure 4:
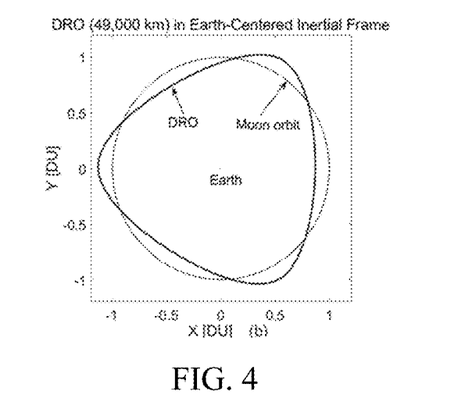
FIG. 4 is a preferred earth-moon long-distance DRO in Embodiment 1.

Specifically, earth-moon DROs with periodic characteristics are deduced from a CRTBP model. DROs are usually expressed in an earth-moon rotating coordinate system, the origin is the earth-moon center of mass, the X axis points from the center of the earth to the center of the moon, the Y axis is perpendicular to the orbit plane of the moon around the earth, and the Z axis completes the right-handed coordinate system, as shown in FIGS. 3 and 4. FIG. 3 shows a family of DROs, and the amplitude in the orbit plane ranges from 49000 km to 149000 km. The amplitude in the orbit plane is defined as the distance from the center of mass of the moon to the DRO (pointing in the direction of the center of the earth). The amplitude of the DRO family outside the orbit plane is generally relatively small. Arrows indicate directions of motion of DROs, which are opposite to the direction of motion of the moon. DU is the average distance between the earth and the moon, which is 384000 km. FIG. 4 shows a DRO with an amplitude of 49000 km in an earth-centered inertia frame, which is a resonance orbit close to 3:1. That is, when the moon orbits the earth once, the DROs the moon three times with an orbital period of about 8 days.

Figure 5:
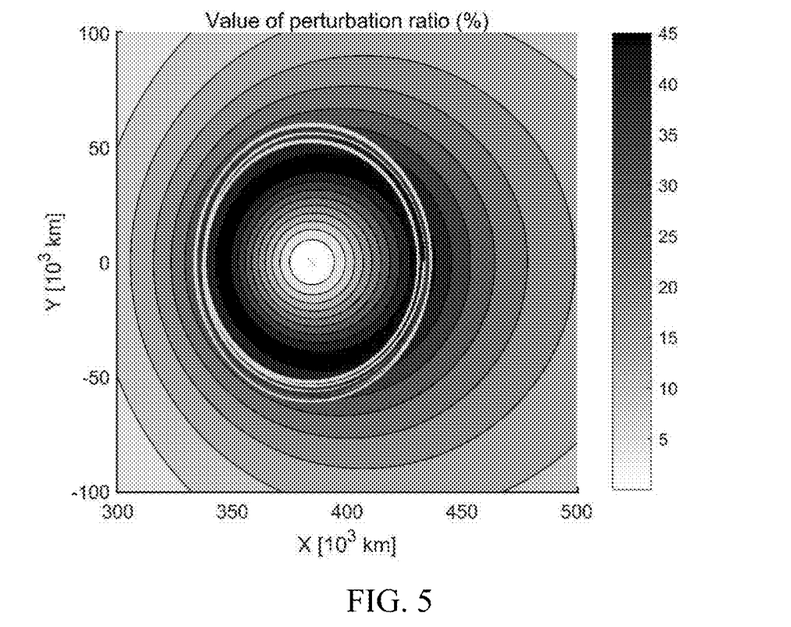
FIG. 5 shows spatial distribution of gravity asymmetry, where a dashed line is a periodic orbit under the CRTBP model (the amplitude is 49000 km), and a solid line is an orbit under a real ephemeris of the solar system.

In fact, some orbits in the DRO family are also located in regions with strong asymmetry of the earth-moon three-body gravity field. Hill gave a concept of gravity field asymmetry to evaluate the degree of asymmetry of the gravity field in different spatial positions. The gravity field asymmetry is defined as the ratio of the amplitude of the acceleration of a third body received at any spatial position to the sum of all accelerations received at the position. When near the earth space, the moon's gravity is classified as the third body; and in contrast, when near the moon space, the earth's gravity is classified as the third body. FIG. 5 shows a diagram of gravity field asymmetry distribution of the moon's orbit plane (namely the orbit plane of the moon around the earth). The darker the color is, the higher the gravity field asymmetry is, and the stronger the asymmetry of the field asymmetry is, the better the autonomous determination ability of the orbit in the period is. The solid line is the DRO with an amplitude of 49000 km in the orbit plane, which can be seen to be in the region with relatively strong asymmetry of the gravitational field, and is the preferred orbit for this method. The ideal DRO is deduced from a CRTBP model. However, under the real solar system ephemeris, the distance between the earth and the moon is time-varying. Besides the influence of the earth-moon gravity, the distance between the earth and the moon is also influenced by the perturbation of solar gravity and the solar radiation light pressure. Under the real ephemeris, the DROs do not coincide strictly any more in each period, as shown by dashed lines in FIG. 5.

Figure 6:
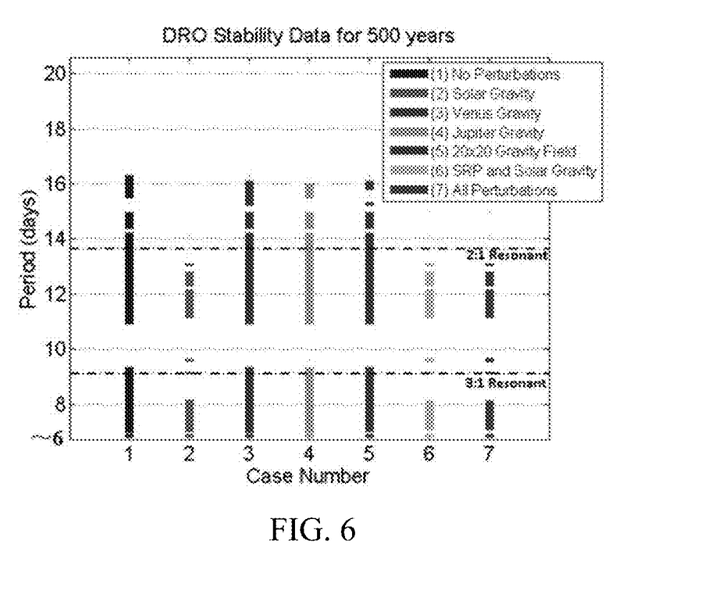
FIG. 6 shows stability analysis of a DRO under different ephemeris models of the solar system.

If a satellite is deployed in the DRO, it is connected to an earth GNSS satellite through an inter-satellite link, which is expected to realize autonomous navigation of the GNSS satellite without depending on ground measurement and control. Compared with a halo orbit, the DRO has the greatest advantage of long-term stability. As shown in FIG. 6, Bezrouk gave the stability analysis of DROs with different periods on the 500-year time scale, and the orbit in a region covered by solid lines is stable. Even if all perturbative forces in the solar system are taken into account (the seventh case), the DRO used herein (with a period of about 8 days) still has a stability of 500 years and is qualified to provide long-term navigation information for GNSS satellites.

Specifically, the establishing a dynamic model of an orbit in step S1 includes the following steps.

B 1: At any time t, $y_D^j(t)$, $y_M^k(t)$ and $y_T^l(t)$ denote position and velocity state vectors of a j-th DRO satellite, a k-th navigation satellite and an l-th LEO data relay satellite, respectively, namely and $y_D^j(t)=[r_D^j(t)^T, v_D^j(t)^T]^T$, $y_M^j(t)=[r_M^j(t)^T, v_M^j(t)^T]^T$ and $y_T^j(t)=[r_T^j(t)^T, v_T^j(t)^T]^T$.

The numbers of satellites participating in orbit determination are J, K and L respectively, $j=0, \ldots, J-1$, $k=0, \ldots, K-1$ and $l=0, \ldots, L-1$, and the state vector of each type of satellites is denoted as:

$$y_D(t)=[y_D^0(t)^T, \ldots, y_D^{J-1}(t)^T]^T$$

and $$y_M(t)=[y_M^0(t)^T, \ldots, y_M^{K-1}(t)^T]^T$$

and $$y_T(t)=[y_T^0(t)^T, \ldots, y_T^{L-1}(t)^T]^T$$

which are further combined into a state vector:

$$X(t)=[y_D(t)^T, y_M(t)^T, y_T(t)^T]^T$$

An orbit state of a satellite is extrapolated according to a first-order dynamic differential equation:

$$\dot{X}(t)=f(X(t),t)$$

B2: Extrapolate a position and velocity state of any satellite of (5) according to a first-order dynamic differential equation, where the differential equation is denoted as:

$$\begin{bmatrix} \dot{r} \\ \dot{v} \end{bmatrix} = \begin{bmatrix} v \\ a_E + a_M + a_S + a_{SRP} + a_D \end{bmatrix}$$

where $a_E$ and $a_M$ are spherical harmonic gravity acceleration models of the earth and the moon respectively, $a_S$ is a gravity acceleration of the solar particle, $a_{SRP}$ is an acceleration of solar radiation light pressure, and $a_D$ is mainly an atmospheric drag acceleration suffered by an LEO satellite.

B3: The calculation of a state transition matrix $\Phi_i \Box \Phi(t_i, t_{i-1}) = \partial X(t_i)/\partial X(t_{i-1})$ from any time $t_{i-1}$ to any time $t_i$ follows a variational equation:

$$\dot{\Phi}_i = \frac{\partial f(t_i, X(t_i))}{\partial X(t_i)} \Phi_i$$

The deduction of the satellite orbit state and the state transition matrix is performed by numerical integration according to equations (6) and (7).

Specifically, step S2 specifically includes:

S21: At any time $t_i$, an inter-satellite measurement model of an l-th LEO satellite and a j-th DRO satellite and a k-th navigation satellite is as follows:

$$\begin{cases} z_{DT,i}^{jl} = h_{DT}^{jl}(y_D^j(t_i), y_T^l(t_i)) + \varepsilon_{DL} = |r_D^j(t_i) - r_T^l(t_i)| + \varepsilon_{DL} \\ z_{MT,i}^{kl} = h_{MT}^{kl}(y_M^k(t_i), y_T^l(t_i)) + \varepsilon_{ML} = |r_M^k(t_i) - r_T^l(t_i)| + \varepsilon_{ML} \end{cases}$$

where z is a measured value, h is a model value, and ε is a measurement noise;

S22: $X_i^-[(y_{D,i}^-)^T,(y_{M,i}^-)^T,(y_{T,i}^-)^T]^T$ being a known initial state of a satellite, and linearizing the measurement model (8) near the state:

$$z_{DT,i}^{jl} = h_{DT}^{jl}(y_{D,i}^{j,-}, y_{T,i}^{l,-}) + H_{DD,i}^{jl} \cdot \Delta y_{D,i}^j + H_{DT,i}^{jl} \cdot \Delta y_{T,i}^l + \varepsilon_{DT}$$

$$z_{MT,i}^{kl} = h_{MT}^{kl}(y_{M,i}^{k,-}, y_{T,i}^{l,-}) + H_{MM,i}^{kl} \cdot \Delta y_{M,i}^k + H_{MT,i}^{kl} \cdot \Delta y_{T,i}^l + \varepsilon_{MT}$$

where $H_{DD,i}^{jl} \Box \frac{\partial h_{DT,i}^{jl}}{\partial y_{D,i}^{j,-}}$, $H_{DT,i}^{jl} \Box \frac{\partial h_{DT,i}^{jl}}{\partial y_{T,i}^{l,-}}$, $H_{MM,i}^{kl} \Box \frac{\partial h_{MT,i}^{kl}}{\partial y_{M,i}^{k,-}}$, $H_{MT,i}^{kl} \Box \frac{\partial h_{MT,i}^{kl}}{\partial y_{T,i}^{l,-}}$, and there are relations $H_{DT,i}^{jl} = -H_{DD,i}^{jl}$ and $H_{MT,i}^{kl} = -H_{MM,i}^{kl}$;

$\Delta X_i = [(\Delta y_{D,i})^T, (\Delta y_{M,i})^T, (\Delta y_{T,i})^T]^T$ is set to be an increment of a to-be-estimated state with respect to an initial value state, and then $\Delta X_i = X_i - X_i^-$;

S23: combining all measured values into $z_i = [z_{DT,i}^T, z_{MT,i}^T]^T$, with a component denoted as:

$$z_{DT,i} = [z_{DT,i}^{00}, \ldots, z_{DT,i}^{J-1,0}, \ldots, z_{DT,i}^{0,L-1}, \ldots, z_{DT,1}^{J-1,L-1}]^T$$

$$z_{MT,i} = [z_{MT,i}^{00}, \ldots, z_{MT,i}^{K-1,0}, \ldots, z_{MT,i}^{0,L-1}, \ldots, z_{MT,i}^{K-1,L-1}]^T$$

where a corresponding model value is $h_i(X_i) = [h_{DT,i}^T, h_{MT,i}^T]^T$, and a measurement error is $\varepsilon = [(\varepsilon_{DL})^T, (\varepsilon_{ML})^T]$; standard deviations of microwave measurement and laser measurement errors are $\sigma_{DL}$ and $\sigma_{ML}$ in respectively; and S24: at the time $t_i$, a linearization measurement model including all measured values is:

$$\begin{bmatrix} z_{DT,i} \\ z_{MT,i} \end{bmatrix} = \begin{bmatrix} h_{DT,i}(X_i^-) \\ h_{MT,i}(X_i^-) \end{bmatrix} + \begin{bmatrix} H_{DD,i} & 0 & H_{DT,i} \\ 0 & H_{MM,i} & H_{MT,i} \end{bmatrix} \cdot \begin{bmatrix} \Delta y_{D,i} \\ \Delta y_{M,i} \\ \Delta y_{T,i} \end{bmatrix} + \begin{bmatrix} \varepsilon_D \\ \varepsilon_M \end{bmatrix}$$

which is further simplified as:

$$z_i = h_i(X_i^-) + H_i \cdot \Delta X_i + \varepsilon$$

The technical solution of this patent is that LEO data relay satellites receive measurement signals of DRO satellites and navigation satellites respectively. The measurement model can be simplified to an instantaneous position measurement value between any two satellites without considering signal propagation time, and the signal propagation time can be calculated through an iterative process.

The data processing method in this embodiment is an EKF method. In the EKF method, in order to compensate for a dynamic modeling error, a process noise u(t) is usually added to a dynamic equation:

$$\dot{X}(t) = f(X(t), u(t), t)$$

u(t) is a white Gaussian noise with zero mean. Correspondingly, a process noise conversion matrix is:

$$\Gamma(t_i, t_{i-1}) = \frac{\partial X(t_i)}{\partial u(t_{i-1})}$$

The EKF is generally used in real-time application scenarios. Given an initial state and time of the satellite, an EKF processes measurement data based on continuous measurement epochs, and a to-be-estimated state is updated.

The process includes two parts. The first step is "time update". A satellite orbit state and a state estimation covariance are advanced from the previous time $t_{i-1}$ (add "+" to a right superscript) to the current observation time $t_i$ (add "−" to a right superscript):

$$X_i^- = X(t_i; X(t_{i-1}) = X_{i-1}^+) + \Gamma(t_i, t_{i-1}) u(t_{i-1})$$

$$P_i^- = \Phi(t_i, t_{i-1}) P_{i-1}^+ \Phi^T(t_i, t_{i-1}) + \Gamma(t_i, t_{i-1}) Q_c \Gamma^T(t_i, t_{i-1})$$

where P is an orbit state covariance matrix, $Q_c$ is a process noise covariance matrix and is a (3J+3K+3L)-dimensional diagonal matrix, a diagonal value is related to dynamic model accuracy of each satellite, and a variance of an acceleration error is set as $\sigma_c^2$. A format of the process noise conversion matrix $\Gamma$ is:

$$\Gamma = \begin{bmatrix} \Gamma_0 & & & 0 \\ & \Gamma_1 & & \\ & & \ddots & \\ 0 & & & \Gamma_{J+K+L-1} \end{bmatrix}$$

where a diagonal submatrix is denoted as:

$$\Gamma_k = \begin{bmatrix} \Delta t^2/2 \times I_{3\times 3} \\ \Delta t \times I_{3\times 3} \end{bmatrix}_{6\times 3}$$

where $\Delta t = t_i - t_{i-1}$, I is an identity matrix, 0 is a zero matrix, and $k=0, 1, \ldots J+K+L-1$.

The process noise covariance matrix can appropriately slow down the convergence rate of the orbit state covariance to maintain the continuous correction of the satellite state by measured values at the end of filtering. Especially in the case of considering the error of the orbital dynamic model, the process noise covariance matrix can adjust the weight of the orbital dynamic model and the measured values to ensure the stable convergence of the navigation process. The state covariance matrix obtained at any measurement time is an estimation of the uncertainty of the satellite state accuracy at this time, which reflects the convergence and accuracy of the orbit state.

The second step is "measurement update". The solution of a satellite orbit state and update of an orbit state covariance are completed by using measurement data:

$$K_i = P_i^- H_i^T (R_i + H_i P_i^- H_i^T)^{-1}$$

$$X_i^+ = X_i^- + K_i(z_i - h(X_i^-))$$

$$P_i^+ = (I - K_i H_i) P_i^- (I - K_i H_i)^T + K_i R_i K_i^T$$

where $K_i$ is a Kalman gain, $H_i$ is a design matrix and is calculated by equation (12), I is an identity matrix, $R_i$ is a measuring noise covariance diagonal matrix, a diagonal element value corresponding to laser measurement data is $\sigma_{DL}^2$, and a diagonal element value corresponding to microwave measurement data is $\sigma_{ML}^2$.

Embodiment 2

In this embodiment, the steps of the method in Embodiment 1 are used to perform simulation scene experiment determination:

The simulation time is set at 0:00 on Jan. 1, 2018 (UTC time), and the simulation time is 14 days. A DRO preferred in Embodiment 1 is selected, with a plane amplitude of 49000 km in the earth-moon rotating coordinate system. Table 1 gives an initial state of the DRO in an earth-centered inertial J2000 coordinate system. The LEO orbit selected is a nearly circular orbit with an altitude of 400 km and an inclination angle of 43°. The initial state is shown in Table 2.

TABLE 1

| Initial state of DROs in a J2000 coordinate system | | | | | |
|---|---|---|---|---|---|
| X [km] | Y [km] | Z [km] | Vx [km/s] | Vy [km/s] | Vz [km/s] |
| −20018.812 | 298708.811 | 126160.320 | 1.263656 | 0.198710 | 0.182677 |

TABLE 2

| Initial value state of orbits of LEO data relay satellites | | | | | |
|---|---|---|---|---|---|
| | Semi-major axis [km] | Eccentricity | Inclination angle [deg] | Right ascension of ascending node [deg] | Argument of perigee [deg] | True anomaly [deg] |
| LEO | 6778.140 | 0.002 | 43.0 | 0.0 | 0.0 | 0.0 |

Taking a GPS navigation constellation as an example, according to a GPS almanac, 31 GPS satellites are selected and distributed in 6 orbit planes. The initial state is shown in Table 3.

TABLE 3

| Initial value state of orbits of GPS constellation satellites | | | | | |
|---|---|---|---|---|---|
| PRN | Semi-major axis [km] | Eccentricity | Inclination angle [deg] | Right ascension of ascending node [deg] | Argument of perigee [deg] | True anomaly [deg] |
| 1 | 26559.562 | 0.005 | 55.3 | 92.0 | 28.3 | 237.0 |
| 2 | 26559.447 | 0.015 | 54.0 | 88.9 | 232.7 | 272.9 |
| 3 | 26558.923 | 0.001 | 55.0 | 153.5 | 197.6 | 28.9 |
| 4 | 26559.346 | 0.012 | 54.0 | 89.6 | 63.9 | 232.5 |
| 5 | 26559.819 | 0.004 | 54.3 | 152.5 | 26.0 | 42.5 |
| 6 | 26558.616 | 0.001 | 55.2 | 91.6 | 159.7 | 45.7 |
| 7 | 26559.960 | 0.009 | 55.4 | 272.8 | 206.1 | 187.3 |
| 8 | 26558.963 | 0.001 | 55.1 | 32.1 | 261.1 | 105.6 |
| 9 | 26560.176 | 0.001 | 54.8 | 211.5 | 135.4 | 314.5 |
| 11 | 26559.120 | 0.016 | 51.3 | 32.2 | 84.3 | 219.2 |
| 12 | 26559.110 | 0.005 | 56.7 | 337.5 | 36.7 | 189.4 |
| 13 | 26559.960 | 0.005 | 55.7 | 218.7 | 117.7 | 237.6 |
| 14 | 26559.829 | 0.008 | 55.3 | 216.4 | 248.3 | 351.3 |
| 15 | 26560.443 | 0.008 | 53.4 | 208.0 | 24.2 | 290.2 |
| 16 | 26559.709 | 0.008 | 56.7 | 338.5 | 18.1 | 54.9 |
| 17 | 26558.903 | 0.011 | 55.9 | 35.5 | 245.2 | 24.9 |
| 18 | 26559.482 | 0.016 | 53.1 | 150.8 | 249.4 | 95.7 |
| 19 | 26575.076 | 0.011 | 55.7 | 37.9 | 37.6 | 119.9 |
| 20 | 26559.663 | 0.005 | 53.1 | 147.7 | 72.0 | 319.7 |
| 21 | 26560.287 | 0.023 | 53.6 | 89.5 | 253.0 | 123.6 |
| 22 | 26559.855 | 0.008 | 52.9 | 150.8 | 242.9 | 54.6 |
| 23 | 26560.921 | 0.010 | 54.2 | 211.5 | 209.7 | 248.5 |
| 24 | 26559.497 | 0.004 | 54.4 | 269.6 | 16.8 | 258.5 |
| 25 | 26559.316 | 0.005 | 56.0 | 334.2 | 41.5 | 146.5 |
| 26 | 26559.729 | 0.000 | 55.0 | 333.2 | 349.8 | 109.5 |
| 27 | 26560.136 | 0.003 | 55.6 | 32.6 | 17.2 | 341.1 |
| 28 | 26560.267 | 0.020 | 56.7 | 338.9 | 265.1 | 26.1 |
| 29 | 26559.814 | 0.001 | 55.9 | 35.9 | 331.1 | 137.0 |
| 30 | 26559.824 | 0.002 | 54.6 | 275.1 | 181.1 | 187.2 |
| 31 | 26559.230 | 0.008 | 55.7 | 273.6 | 330.7 | 211.3 |
| 32 | 26559.839 | 0.011 | 54.3 | 157.8 | 9.1 | 215.1 |

Inter-satellite measurement is performed between an LEO data relay satellite (the number of the satellite is 1, L=1) and a DRO satellites (the number of the satellite is 1, J=1), and a standard deviation of a measurement error is set to 0.01 m (1σ). Inter-satellite measurement is performed between an LEO satellite and each navigation constellation satellite (the number of the satellites is 31, K=31), and a standard deviation of a measurement error is also set to 0.01 m (1σ). There is no measurement link between navigation satellites. The measurement accuracy setting of 0.01 m is basically in line with the actual space laser and microwave measurement accuracy. Planetary occlusion is taken into account in the measurement. At the same time, it is assumed that an antenna of an LEO satellite navigation receiver points to the zenith direction, and measurement signals can be received when the antenna elevation angle is 5° or more. For the sake of simplicity, all satellites adopt the same orbital dynamic model setting. The gravity fields of the earth and the moon both adopt a 70-order spherical harmonic model. Taking the solar particle gravity, the solar radiation light pressure and a near-earth atmospheric drag model into account, the area-to-mass ratio is set to a fixed value of 0.002 m²/kg, and the light pressure coefficient $C_R$ and drag coefficient $C_D$ are 1.3 and 2.5 respectively. See Table 4 for specific simulation settings.

TABLE 4

Dynamic model and measurement parameter settings

| | |
|---|---|
| Ephemeris model | JPL DE405 |
| Planetary ephemeris | JPL DE405 |
| Lunar libration angle | |
| Reference coordinate frame | J2000 |
| Mechanical model | Substantially |
| Gravity field of the earth | 70 × 70 GGM02C |
| Gravity field of the moon | 70 × 70 GL0660B |
| Three-body gravity | Solar particle gravity |
| Solar radiation light pressure | Area-to-mass ratio: 0.002 m²/kg, $C_R$:1.3 |
| Near-earth atmospheric drag | Area-to-mass ratio: 0.002 m²/kg, $C_D$:2.5 |
| Numerical integrator | Runge-Kutta-4, with a step size of 60 s |
| Measurement model | Instantaneous position measurement |
| White Gaussian noise | Average: 0 m |
| Measurement period | Standard deviation: 0.01 m (1σ) Δt = 60 s |

The dynamic model in the navigation calculation process also adopts the settings in Table 4. An initial position error of each satellite is 1000 m (1σ) and an initial velocity error is 0.1 m/s. Diagonal elements in a noise matrix during extended Kalman filter are all set to $0.01^2$ m², which is consistent with a measurement error. A diagonal element $\sigma_c$ in the process noise matrix $Q^c$ of equation (15) corresponding to a DRO satellite state is set to $1\times10^{-9}$ m/s², and $\sigma_c$ corresponding to navigation satellite and LEO satellite states is set to $1\times10^{-8}$ m/s².

Figure 7:
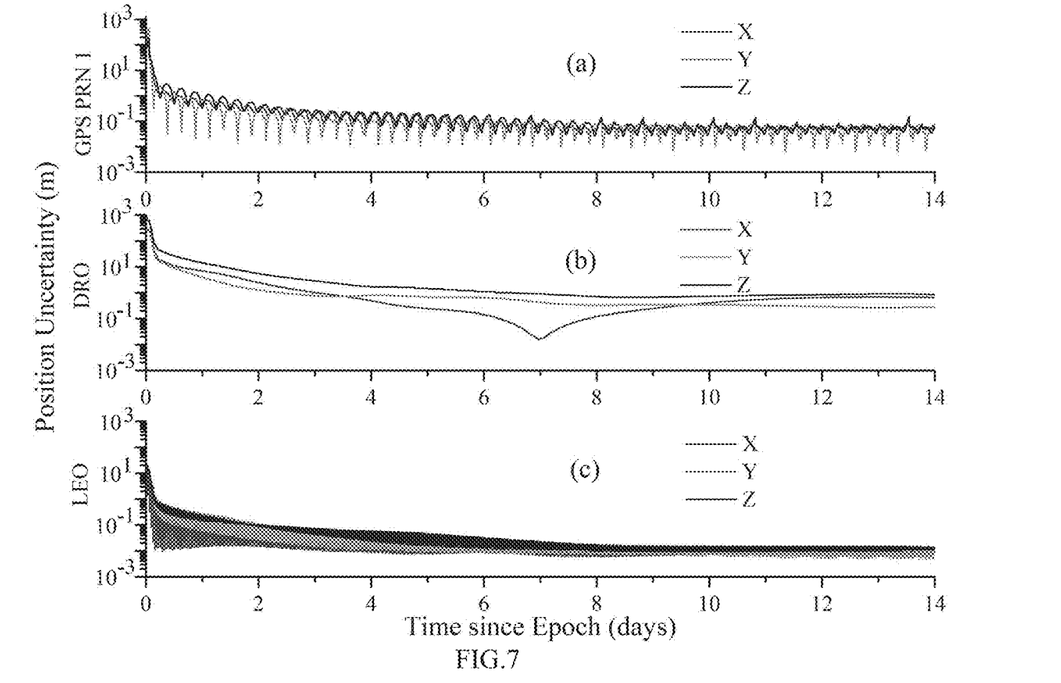
FIG. 7 shows position filtering uncertainty of a GPS satellite (PRN 1, a), a DRO satellite (b) and an LEO satellite (c), indicating that X/Y/Z is the X axis, Y axis and Z axis of coordinates respectively in a J2000 coordinate system.
Figure 8:
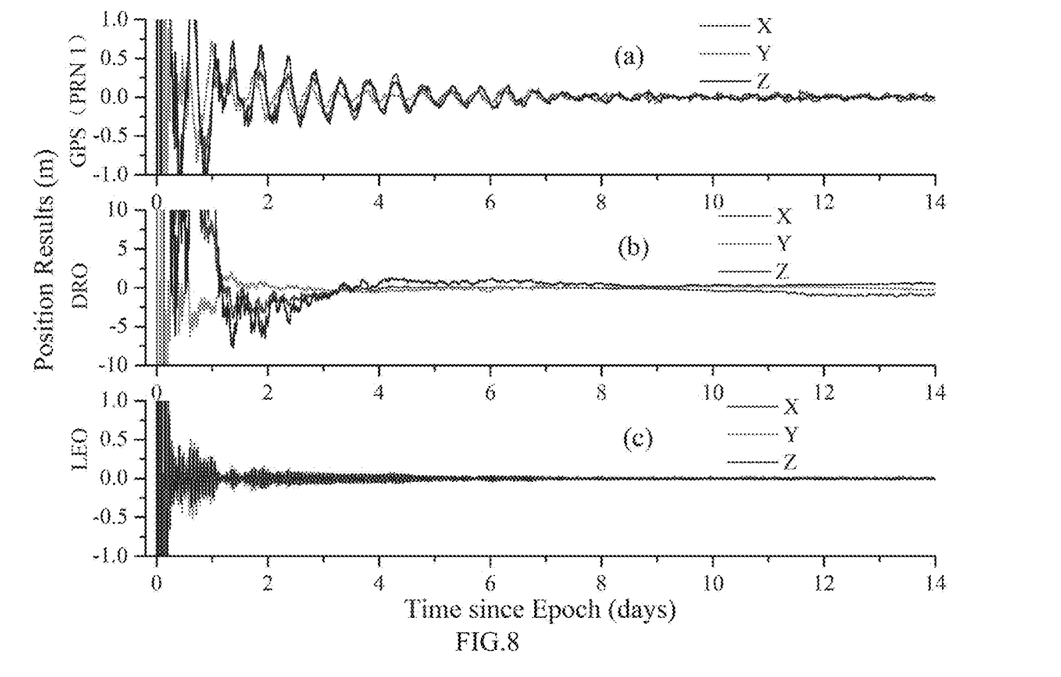
FIG. 8 shows position residuals of the GPS satellite (PRN 1, a), the DRO satellite (b) and the LEO satellite (c), indicating changes with time in the J2000 coordinate system, where X/Y/Z is the X axis, Y axis and Z axis of coordinates respectively.
Figure 9:
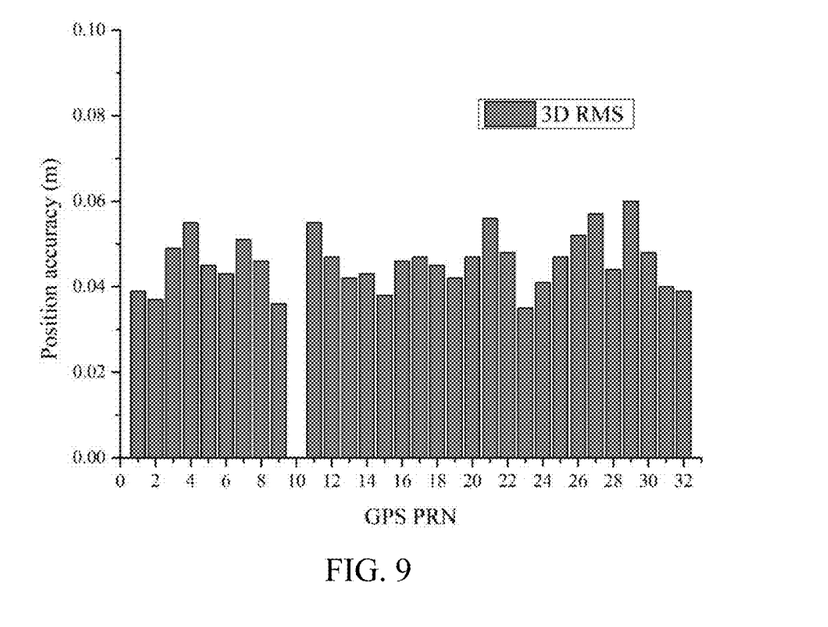
FIG. 9 shows position filtering accuracy of GPS constellation satellites when inter-satellite measurement accuracy is 0.01 m.

The position uncertainty is calculated from diagonal elements of the state covariance matrix in the filter process, which can characterize the convergence and accuracy of the position filtering process. FIG. 7 shows changes of position filtering uncertainty of GPS satellites (taking PRN 1 as an example), DRO satellites and LEO satellites with time. Only simulation results of GPS satellites with PRN of 1 are given, and other GPS satellites have similar results. It can be seen from the figure that the LEO satellite converges fastest, the GPS satellite comes second, the DRO satellite is slowest, but in the end all satellite position states converge to higher accuracy. The GPS satellite converges to 0.1 m, the DRO satellite converges to 1 m, and the LEO satellite converges to cm level. FIG. 8 shows changes of the position residual (namely the difference between the position filtering solution and the true position value) with time. It can be seen that the convergence rate of position filtering for all satellites is very fast, and the final positioning accuracy is very high. When the filtering process converges and then the positioning accuracy is counted, the 3D RMS of DRO position residual is 1 m, the 3D RMS of the LEO is 0.01 m, which reaches the inter-satellite measurement accuracy, and the 3D RMS of the GPS satellite (PRN 1) is 0.04 m, which also achieves very high accuracy. FIG. 9 shows the positioning accuracy of all satellites of the GPS constellation when the inter-satellite measurement accuracy is 0.01 m, which shows that the positioning accuracy of all satellites is better than 0.06 m. This simulation result is approximately equivalent to the accuracy of the high-precision ephemeris of the GPS constellation.

Figure 10:
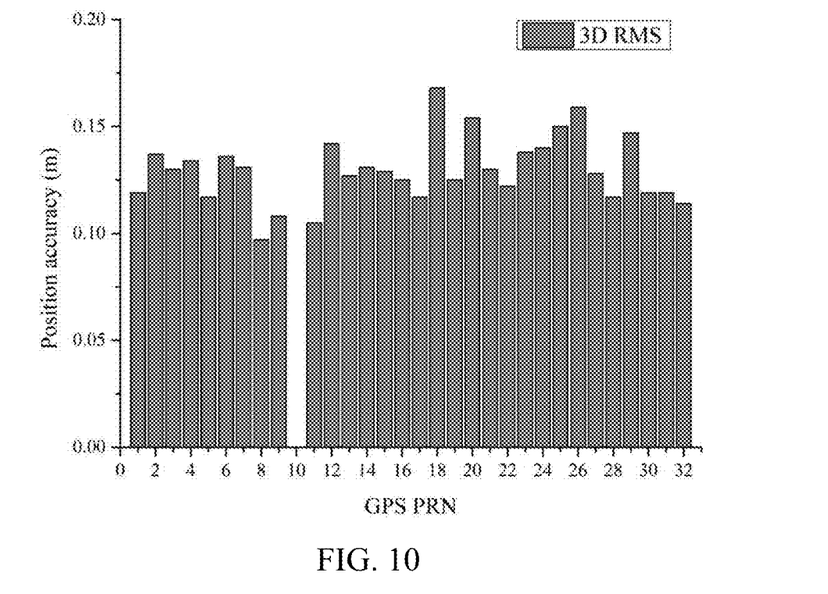
FIG. 10 shows position filtering accuracy of GPS constellation satellites when inter-satellite measurement accuracy is 0.1 m.

When other simulation conditions remain unchanged and the inter-satellite measurement accuracy is relaxed to 0.1 m, as shown in FIG. 10, the positioning accuracy of the DRO satellite is 1.6 m, and the positioning accuracy of the LEO satellite is 0.03 m. The positioning accuracy of most satellites of the GPS constellation can reach 0.15 m.

Two sets of simulation results are given above. When the inter-satellite laser and microwave measurement accuracy is set to 0.01 m, the autonomous navigation position accuracy of GPS constellation satellites reaches 0.06 m. When the measurement accuracy is set to 0.1 m, the GPS autonomous navigation position accuracy reaches 0.15 m. The simulation results show that if the inter-satellite measurement accuracy is better than 0.1 m, the technical solution of autonomous navigation of the navigation constellation satellites proposed in this patent is feasible. Even if there is only one DRO satellite and one LEO satellite, the navigation constellation can realize high-precision autonomous navigation without depending on ground measurement and control.

The foregoing descriptions are only preferred implementations of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A method for achieving space-based autonomous navigation of global navigation satellite system (GNSS) satellites, comprising the following steps:
    S1: optimizing an earth-moon space DRO, and establishing a dynamic model of an earth-moon space satellite orbit;
    S2: establishing measurement links, by a low earth orbit (LEO) data relay satellite, with an earth-moon space DRO satellite and a GNSS satellite respectively, and measuring an inter-satellite distance for modeling and linearization; and
    S3: adopting a data processing method to process inter-satellite measurement data, and achieving autonomous navigation of the GNSS satellite without depending on the ground measurement and control support.

2. The method for achieving autonomous navigation of GNSS satellites according to claim 1, wherein in step S1, the optimizing an earth-moon space DRO specifically comprises:
    A1: deducing an earth-moon DRO family with periodic characteristics from a circular restricted three-body problem (CRTBP) model; and
    A2: calculating gravity asymmetry of each orbit, and selecting an orbit with high gravity asymmetry as a preferred earth-moon DRO.

3. The method for achieving autonomous navigation of GNSS satellites according to claim 1, wherein in step S1, the establishing a dynamic model of an earth-moon space satellite orbit specifically comprises:

B1: establishing satellite state vectors: at any time t, $y_D^j(t)$, $j_M^k(t)$ and $y_T^l(t)$ denote position and velocity state vectors of a j-th DRO satellite, a k-th navigation satellite and an l-th LEO data relay satellite, respectively, namely $y_D^j(t)=[r_D^j(t)^T,v_D^j(t)^T]^T$, $y_M^j(t)=[r_M^j(t)^T,v_M^j(t)^T]^T$ and $y_T^j(t)=[r_T^j(t)^T,v_T^j(t)^T]^T$;

wherein the numbers of satellites participating in orbit determination are J, K and L respectively, j=0, ...,J−1, k=0, ...,K−1 and l=0, ...,L−1 , and the state vector of each type of satellites is denoted as:

$$y_D(t)=[y_D^0(t)^T,\ldots,y_D^{J-1}(t)^T)]^T \quad (1)$$

and $$y_M(t)=[y_M^0(t)^T,\ldots,y_M^{K-1}(t)^T)]^T \quad (2)$$

and $$y_T(t)=[y_T^0(t)^T,\ldots,y_T^{L-1}(t)^T)]^T \quad (3)$$

which are further combined into a state vector:

$$X(t)=[y_D(t)^T,y_M(t)^T,y_T(t)^T]^T \quad (4);$$

B2: a differential equation of an orbital motion state of any satellite is:

$$\begin{bmatrix} \dot{r} \\ \dot{v} \end{bmatrix} = \begin{bmatrix} v \\ a_E + a_M + a_S + a_{SRP} + a_D \end{bmatrix} \quad (5)$$

wherein $a_E$ and $a_M$ are spherical harmonic gravity acceleration models of the earth and the moon respectively, $a_S$ is a gravity acceleration of the solar particle, $a_{SRP}$ is an acceleration of solar radiation light pressure, and $a_D$ is mainly an atmospheric drag acceleration suffered by an LEO satellite; and B3: calculating a state transition matrix $\Phi_i \Box \Phi(t_i,t_{i-1}) = \partial X(t_i)/\partial X(t_{i-1})$ from any time $t_{i-1}$ to any time $t_i$.

4. The method for achieving autonomous navigation of GNSS satellites according to claim 3, wherein in step B2, a first-order dynamic differential equation used as a basis is:

$$\dot{X}(t)=f(X(t),t) \quad (6)$$ and in step B3, the state transition matrix for state calculation follows a variational equation:

$$\dot{\Phi}_i = \frac{\partial f(t_i, X(t_i))}{\partial X(t_i)} \Phi_i. \quad (7)$$

5. The method for achieving autonomous navigation of GNSS satellites according to claim 1, wherein step S2 specifically comprises:

S21: at any time $t_i$, an inter-satellite measurement model of an l-th LEO satellite and a j-th DRO satellite and a k-th navigation satellite being as follows:

$$\begin{cases} z_{DT,i}^{jl} = h_{DT}^{jl}(y_D^j(t_i), y_T^l(t_i)) + \varepsilon_{DL} = |r_D^j(t_i) - r_T^l(t_i)| + \varepsilon_{DL} \\ z_{MT,i}^{kl} = h_{MT}^{kl}(y_M^k(t_i), y_T^l(t_i)) + \varepsilon_{ML} = |r_M^k(t_i) - r_T^l(t_i)| + \varepsilon_{ML} \end{cases} \quad (8)$$

wherein z is a measured value, h is a model value, and ε is a measurement noise;

S22: $X_i^-[(y_{D,i}^-)^T,(y_{M,i}^-)^T,(y_{T,i}^-)^T]^T$ being a known initial state of a satellite, and linearizing the measurement model (8) near the state:

$$z_{DT,i}^{jl} = h_{DT}^{jl}(y_{D,i}^{j-}, y_{T,i}^{l-}) + H_{DD,i}^{jl} \cdot \Delta y_{D,i}^j + H_{DT,i}^{jl} \cdot \Delta y_{T,i}^l + \varepsilon_{DT} \quad (9)$$

$$z_{MT,i}^{kl} = h_{MT}^{kl}(y_{M,i}^{k-}, y_{T,i}^{l-}) + H_{MM,i}^{kl} \cdot \Delta y_{M,i}^k + H_{MT,i}^{kl} \cdot \Delta y_{T,i}^l + \varepsilon_{MT}$$

wherein $$H_{DD,i}^{jl} \Box \frac{\partial h_{DT,i}^{jl}}{\partial y_{D,i}^{j-}}, H_{DT,i}^{jl} \Box \frac{\partial h_{DT,i}^{jl}}{\partial y_{T,i}^{l-}}, H_{MM,i}^{kl} \Box \frac{\partial h_{MT,i}^{kl}}{\partial y_{M,i}^{k-}}, H_{MT,i}^{kl} \Box \frac{\partial h_{MT,i}^{kl}}{\partial y_{T,i}^{l-}},$$

and there are relations $H_{DT,i}^{jl}=-H_{DD,i}^{jl}$ and $H_{MT,i}^{kl}=-H_{MM,i}^{kl}$;

$\Delta X_i=[(\Delta y_{D,i}^-)^T,(\Delta y_{M,i}^-)^T,(\Delta y_{T,i}^-)^T]^T$ is set to be an increment of a to-be-estimated state with respect to an initial value state, and then $\Delta X_i=X_i-X_i^-$;

S23: combining all measured values into $z_i=[z_{DT,i}^T,z_{MT,i}^T]^T$, with a component denoted as:

$$z_{DT,i} = [z_{DT,i}^{00}, \ldots, z_{DT,i}^{J-1,0}, \ldots, z_{DT,i}^{0,L-1}, \ldots, z_{DT,1}^{J-1,L-1}]^T \quad (10)$$

$$z_{MT,i} = [z_{MT,i}^{00}, \ldots, z_{MT,i}^{K-1,0}, \ldots, z_{MT,i}^{0,L-1}, \ldots, z_{MT,i}^{K-1,L-1}]^T$$

wherein a corresponding model value $h_i(X_i)=[h_{DT,i}^T,h_{MT,i}^T]^T$, and a measurement error is $\varepsilon=[(\varepsilon_{DL})^T,(\varepsilon_{ML})^T]$;

standard deviations of microwave measurement and laser measurement errors are $\sigma_{DL}$ and $\sigma_{ML}$ respectively; and S24: at the time $t_i$, a linearization measurement model comprising all measured values is:

$$\begin{bmatrix} z_{DT,i} \\ z_{MT,i} \end{bmatrix} = \begin{bmatrix} h_{DT,i}(X_i^-) \\ h_{MT,i}(X_i^-) \end{bmatrix} + \begin{bmatrix} H_{DD,i} & 0 & H_{DT,i} \\ 0 & H_{MM,i} & H_{MT,i} \end{bmatrix} \cdot \begin{bmatrix} \Delta y_{D,i} \\ \Delta y_{M,i} \\ \Delta y_{T,i} \end{bmatrix} + \begin{bmatrix} \varepsilon_D \\ \varepsilon_M \end{bmatrix} \quad (11)$$

which is further simplified as:

$$z_i=h_i(X_i^-)+H_i \cdot \Delta X_i+\varepsilon \quad (12)$$

6. The method for achieving autonomous navigation of GNSS satellites according to claim 1, wherein the data processing method in step S3 is an extended Kalman filter (EKF) method, which specifically comprises:

S31: adding a process noise u(t) to a dynamic equation:

$$\dot{X}(t)=f(X(t),u(t),t) \quad (13)$$

wherein $u(t)$ is a white Gaussian noise with zero mean; correspondingly, a process noise conversion matrix is:

$$\Gamma(t_i, t_{i-1}) = \frac{\partial X(t_i)}{\partial u(t_{i-1})}; \quad (14)$$

and

S32: given an initial state and time of the satellite, processing, by an extended Kalman filter (EKF), measurement data based on continuous measurement epochs, and updating a to-be-estimated state.

7. The method for achieving autonomous navigation of GNSS satellites according to claim 6, wherein step S32 specifically comprises:

A. time update
wherein a satellite orbit state and a state estimation covariance are advanced from the previous time $t_{i-1}$ to the current observation time $t_i$:

$$X_i^- = X(t_i; X(t_{i-1}) = X_{i-1}^+) + \Gamma(t_i, t_{i-1})u(t_{i-1})$$

$$P_i^- = \Phi(t_i, t_{i-1})P_{i-1}^+ \Phi^T(t_i, t_{i-1}) + \Gamma(t_i, t_{i-1})Q_c\Gamma^T(t_i, t_{i-1}) \quad (15)$$

wherein P is an orbit state covariance matrix, $Q_c$ is a process noise covariance matrix and is a (3J+3K+3L)-dimensional diagonal matrix, a diagonal value is related to dynamic model accuracy of each satellite, and a variance of an acceleration error is set as $\sigma_c^2$; a format of the process noise conversion matrix $\Gamma$ is:

$$\Gamma = \begin{bmatrix} \Gamma_0 & & 0 \\ & \Gamma_1 & \\ & & \ddots \\ 0 & & \Gamma_{J+K+L-1} \end{bmatrix} \quad (16)$$

wherein a diagonal submatrix is denoted as:

$$\Gamma_k = \begin{bmatrix} \Delta t^2/2 \times I_{3\times 3} \\ \Delta t \times I_{3\times 3} \end{bmatrix}_{6\times 3} \quad (17)$$

where $\Delta t = t_i - t_{i-1}$, I is an identity matrix, 0 is a zero matrix, and k=0,1, . . . ,J+K+L−1.

B. measurement update
where the solution of a satellite orbit state and update of an orbit state covariance are completed by using measurement data:

$$K_i = P_i^- H_i^T(R_i + H_i P_i^- H_i^T)^{-1}$$

$$X_i^+ = X_i^- + K_i(z_i - h(X_i^-))$$

$$P_i^+ = (I - K_i H_i)P_i^-(I - K_i H_i)^T + K_i R_i K_i^T \quad (18)$$

wherein $K_i$ is a Kalman gain, $H_i$ is a design matrix and is calculated by equation (12), I is an identity matrix, $R_i$ is a measuring noise covariance diagonal matrix, a diagonal element value corresponding to laser measurement data is $\sigma_{DL}^2$, and a diagonal element value corresponding to microwave measurement data is $\sigma_{ML}^2$.

8. The method for achieving autonomous navigation of GNSS satellites according to claim 1, wherein the method is applicable to all navigation systems, comprising at least one of a GPS system, a Beidou system, a Glonass system, a Galileo system and a quasi-zenith navigation system.

9. The method for achieving autonomous navigation of GNSS satellites according to claim 2, wherein the method is applicable to all navigation systems, comprising at least one of a GPS system, a Beidou system, a Glonass system, a Galileo system and a quasi-zenith navigation system.

10. The method for achieving autonomous navigation of GNSS satellites according to claim 3, wherein the method is applicable to all navigation systems, comprising at least one of a GPS system, a Beidou system, a Glonass system, a Galileo system and a quasi-zenith navigation system.

11. The method for achieving autonomous navigation of GNSS satellites according to claim 4, wherein the method is applicable to all navigation systems, comprising at least one of a GPS system, a Beidou system, a Glonass system, a Galileo system and a quasi-zenith navigation system.

12. The method for achieving autonomous navigation of GNSS satellites according to claim 5, wherein the method is applicable to all navigation systems, comprising at least one of a GPS system, a Beidou system, a Glonass system, a Galileo system and a quasi-zenith navigation system.

13. The method for achieving autonomous navigation of GNSS satellites according to claim 6, wherein the method is applicable to all navigation systems, comprising at least one of a GPS system, a Beidou system, a Glonass system, a Galileo system and a quasi-zenith navigation system.

14. The method for achieving autonomous navigation of GNSS satellites according to claim 7, wherein the method is applicable to all navigation systems, comprising at least one of a GPS system, a Beidou system, a Glonass system, a Galileo system and a quasi-zenith navigation system.

* * * * *